US012664832B2

(12) United States Patent
Hoin et al.

(10) Patent No.: US 12,664,832 B2
(45) Date of Patent: Jun. 23, 2026

(54) REAL TIME DIAGNOSTIC TRANSLATION ON VEHICLE CONTROLLER

(71) Applicant: FCA US LLC, Auburn Hills, MI (US)

(72) Inventors: Andrew D Hoin, Auburn Hills, MI (US); Thomas E Apczynski, Livonia, MI (US); Raghuvirsinh Sodha, Troy, MI (US)

(73) Assignee: FCA US LLC, Auburn Hills, MI (US)

( * ) Notice: Subject to any disclaimer, the term of this patent is extended or adjusted under 35 U.S.C. 154(b) by 113 days.

(21) Appl. No.: 18/652,298

(22) Filed: May 1, 2024

(65) Prior Publication Data

US 2025/0342734 A1     Nov. 6, 2025

(51) Int. Cl.
G07C 5/08          (2006.01)
G07C 5/00          (2006.01)
H04L 12/40          (2006.01)

(52) U.S. Cl.
CPC ........... G07C 5/0808 (2013.01); G07C 5/008 (2013.01); H04L 12/40 (2013.01); H04L 2012/40215 (2013.01); H04L 2012/40273 (2013.01)

(58) Field of Classification Search
CPC ....... G07C 5/0808; G07C 5/008; H04L 12/40; H04L 2012/40215; H04L 2012/40273
See application file for complete search history.

(56) References Cited

FOREIGN PATENT DOCUMENTS

DE      102019000852 A1 * 11/2019 .............. H04W 4/44
WO      WO-2017131763 A1 * 8/2017 ........... H04L 12/403

* cited by examiner

*Primary Examiner* — Michael V Kerrigan
(74) *Attorney, Agent, or Firm* — Jeremy J. Klobucar

(57)          ABSTRACT

A diagnostic translation system for a vehicle includes a telematics device configured to communicate with a back-end server via a network, a CAN bus in signal communication with one or more electronic vehicle systems, and a controller having one or more processors and a non-transitory computer-readable storage medium. Diagnostic trouble code (DTC) translation files are preloaded onto the non-transitory computer-readable storage medium. The controller is programmed to request and receive, via the CAN bus, raw DTCs from the one or more electronic vehicle systems, and perform, using the DTC translation files, a local real-time diagnostic translation of the raw DTCs into a human-understandable format.

20 Claims, 4 Drawing Sheets

REAL TIME DIAGNOSTIC TRANSLATION ON VEHICLE CONTROLLER

FIELD

The present application relates generally to vehicle control systems and, more particularly, to vehicle control systems for providing a local service to process onboard real-time diagnostic translations.

BACKGROUND

It is often challenging to troubleshoot vehicle diagnostic codes for several reasons. First, there are many different systems and components in a modern vehicle that can cause an issue, making it difficult to isolate the problem. Second, the diagnostic codes themselves may not always be specific or clear, requiring further testing and analysis to determine the root cause of the issue. Third, some diagnostic tools may require specialized training or knowledge for accurate interpretation. Finally, some issues may be intermittent or occur only under certain conditions, making it challenging to reproduce the problem for diagnosis. Accordingly, while such systems do work well for their intended purpose, there remains a desire for improvement in the relevant art.

SUMMARY

In accordance with one example aspect of the invention, a diagnostic translation system for a vehicle is provided. In one example, the diagnostic translation system includes a telematics device configured to communicate with a backend server via a network, a CAN bus in signal communication with one or more electronic vehicle systems, and a controller having one or more processors and a non-transitory computer-readable storage medium. Diagnostic trouble code (DTC) translation files are preloaded onto the non-transitory computer-readable storage medium. The controller is programmed to request and receive, via the CAN bus, raw DTCs from the one or more electronic vehicle systems, and perform, using the DTC translation files, a local real-time diagnostic translation of the raw DTCs into a human-understandable format.

In addition to the foregoing, the described diagnostic translation system may include one or more of the following features: a vehicle display, wherein the controller is further programmed to provide a notification on the vehicle display regarding the translated raw DTCs, to thereby inform a user of any associated vehicle issues and facilitate resolution thereof without specialized externally coupled onboard diagnostics devices or vehicle technicians; wherein the DTC translation files include a diagnostic definition configured to generate software policies and instructions to determine how the DTCs will be monitored, transmitted, translated, and processed by the controller; and wherein the raw DTCs are a hexadecimal code.

In addition to the foregoing, the described diagnostic translation system may include one or more of the following features: wherein the translated raw DTCs correspond to a descriptive fault message, and wherein the controller is configured to display the descriptive fault message on a vehicle display; wherein the controller is further programmed to provide the translated raw DTCs to the one or more electronic vehicle systems via the CAN bus for further onboard processing purposes; and wherein the further onboard processing purposes includes at least one of setting diagnostic trouble flags, running troubleshooting routines to identify a root cause, implementing fault mitigations or fail-safe modes, and analyzing time-series data and fault trends.

In addition to the foregoing, the described diagnostic translation system may include one or more of the following features: wherein the controller is further programmed to periodically check, via the telematics device, if any new or updated DTC translation files are available from the backend server; and wherein the controller is further programmed to transmit, via the telematics device, the translated raw DTCs to the backend server for further use.

In accordance with another example aspect of the invention, a computer-implemented method for locally translating raw diagnostic trouble codes (DTCs) for a vehicle is provided. In one example, the vehicle includes a telematics device configured to communicate with a backend server, a CAN bus in signal communication with one or more electronic vehicle systems, and a controller having one or more processors and a non-transitory computer-readable storage medium.

In the described example, the method includes pre-loading diagnostic trouble code (DTC) translation files onto the non-transitory computer-readable storage medium; requesting and receiving, by the controller and via the CAN bus, raw DTCs from the one or more electronic vehicle systems; and performing, by the controller and with the DTC translation files, a local real-time diagnostic translation of the of the raw DTCs into a human-understandable format.

In addition to the foregoing, the described method may include one or more of the following features: displaying, by the controller, a notification on a display of the vehicle regarding the translated raw DTCs, to thereby inform a user of any associated vehicle issues and facilitate resolution thereof; wherein the DTC translation files include a diagnostic definition configured to generate software policies and instructions to determine how the DTCs will be monitored, transmitted, translated, and processed by the controller; wherein the raw DTCs are a hexadecimal code; and wherein the translated raw DTCs correspond to a descriptive fault message, the method further including displaying, by the controller, the descriptive fault message on a display of the vehicle.

In addition to the foregoing, the described method may include one or more of the following features: providing, by the controller and via the CAN bus, the translated raw DTCs to the one or more electronic vehicle systems, and performing, via the one or more electronic vehicle systems, further onboard processing utilizing the translated raw DTCs; wherein the further onboard processing includes at least one of setting diagnostic trouble flags, running troubleshooting routines to identify a root cause, implementing fault mitigations or fail-safe modes, and analyzing time-series data and fault trends; periodically checking, by the controller and via the telematics device, if any new or updated DTC translation files are available from the backend server; and transmitting, by the controller and via the telematics device, the translated raw DTCs to the backend server for further use.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings references therein, are merely exemplary in nature intended for purposes of illustration only and are not intended to limit the scope of the present disclosure, its application or uses. Thus, variations that do not depart from the gist of the present disclosure are intended to be within the scope of the present disclosure.

DETAILED DESCRIPTION

Figure 1:
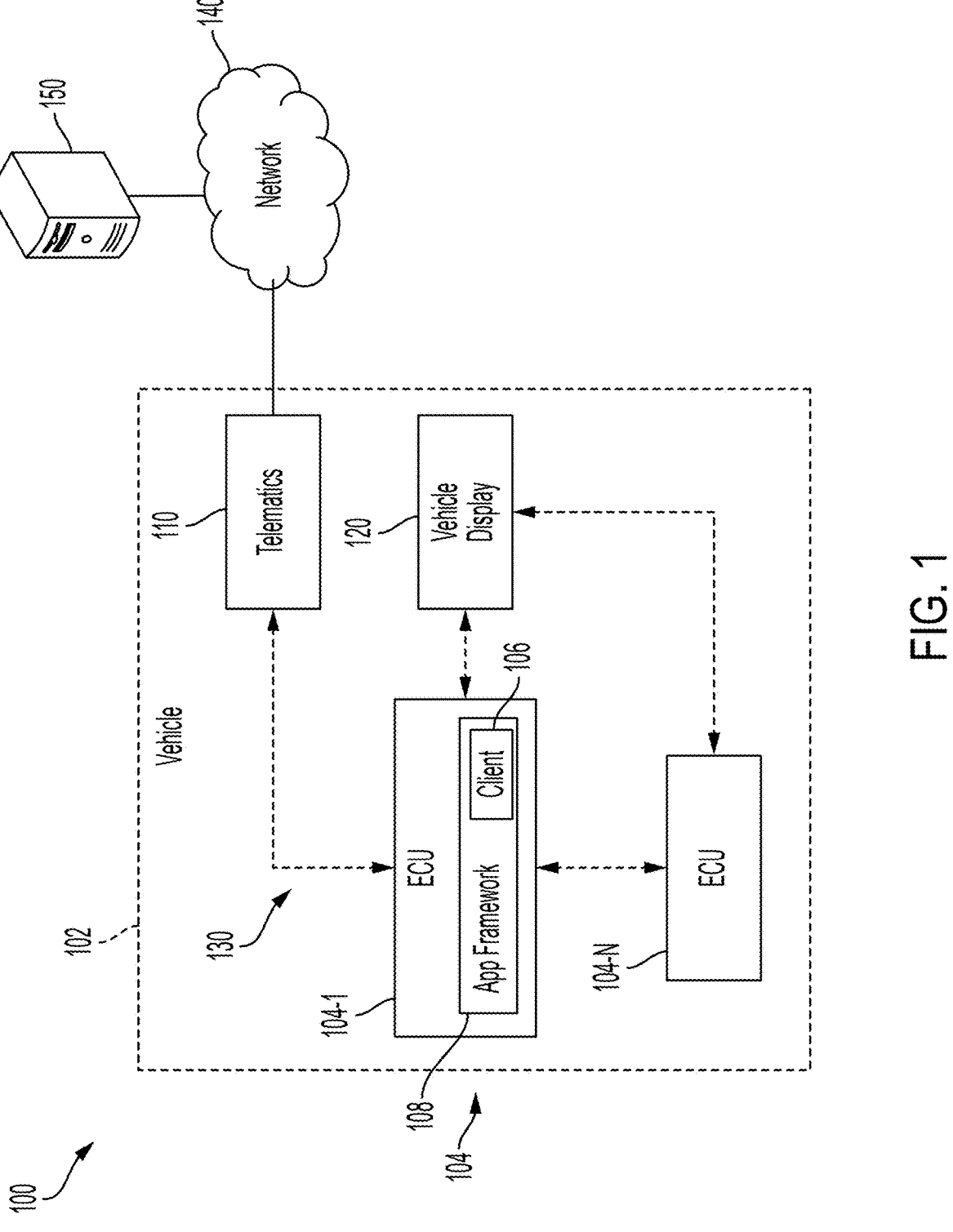
FIG. 1 is schematic diagram of an example vehicle diagnostic translation system in accordance with the principles of the present application.

As previously discussed, it is often challenging to troubleshoot vehicle diagnostic codes. The automotive industry typically uses a specific set of diagnostic translations known as diagnostic trouble codes (DTCs) for troubleshooting such issues. However, vehicle DTCs are specific to each manufacturer and vehicle model, so the process for translating the DTCs is often quite varied.

The vehicle diagnostic codes may be decoded by (i) referring to the vehicle owner's manual or online resources to locate information on how to access and interpret diagnostic codes for a specific vehicle, and (ii) using a code reader tool, such as an electronic device that plugs into the vehicle OBD-II port (located under the vehicle dashboard) to retrieve the diagnostic codes, which may provide basic information about the issue causing the code and potential solutions. Once a diagnostic code is retrieved, it may be referenced in a code chart or database to determine its meaning, typically requiring searching for the specific code by manufacturer, model, and year of the vehicle. It may also be necessary to consult with a mechanic or auto repair shop to further diagnose and repair any issues causing the diagnostic code.

However, decoding vehicle diagnostic codes often requires some level of technical knowledge and may be time consuming for those who are unfamiliar with automotive diagnostics. Further, inaccurate interpretation or translation of the diagnostic codes may lead to misdiagnosis or incorrect repairs, which could potentially cause further damage to the vehicle. Because of this, it is recommended to consult with a qualified mechanic or auto repair shop for diagnosing and repairing any issues related to vehicle diagnostic codes.

Accordingly, the systems and methods described herein provide a local service on the vehicle configured to process real-time diagnostic translations onboard using one or more vehicle electronic control units (ECUs). In one example, diagnostic translations are initially loaded onto the ECU or module and are updated via a telematics service back-end cloud system. This provides the ability to update the ECU's database of trouble codes as new models and versions of vehicles are released, ensuring the database remains up to date with the latest industry standards and best practices. The system also creates custom diagnostic signal translations for any signals or data not covered by the existing data sources. The real-time diagnostic translation feature is also configured to notify the driver or mechanic of any issues in a simple and straightforward manner. In this way, the system is configured to provide a convenient and cost-effective solution for diagnosing and resolving issues with a vehicle's ECU in real-time to thereby improve operations, fuel efficiency, and overall performance.

Unlike conventional solutions, the system described herein is configured to translate ECU trouble codes in real-time on the module and thus provides several advantages. One advantage is increased diagnostic accuracy, as real-time translation of trouble codes allows for immediate identification and resolution of issues with the vehicle's ECU. This facilitates reducing downtime and maintenance costs by avoiding unnecessary repairs or replacing parts that are not faulty. Additionally, real-time translation of ECU trouble codes ensures that any potential issues with the vehicle's engine or other systems are promptly identified and addressed. Another advantage is increased convenience for drivers, as they are able to diagnose and resolve issues quickly and easily without needing to take their vehicle to a mechanic or dealership for service. Finally, real-time translation of ECU trouble codes facilitates improved fuel efficiency by identifying and resolving any issues that may be causing the vehicle to operate inefficiently or improperly.

With reference now to FIG. 1, an example vehicle diagnostic translation system 100 for a vehicle 102 is illustrated in accordance with the principles of the present disclosure. In the example embodiment, the vehicle diagnostic translation system 100 is generally intended for locally processing real-time diagnostic translations onboard utilizing one or more vehicle electronic control units (ECUs) 104. However, it will be appreciated that vehicle diagnostic translation system 100 is not limited thereto and may be utilized with other vehicle features or systems.

In the example embodiment, vehicle diagnostic translation system 100 generally includes a plurality of ECUs 104 (e.g., computing device, module, or controller) in signal communication with a telematics device 110 and one or more vehicle displays 120 via a controller area network (CAN) bus 130 (or other alternative local communication network, e.g., ethernet). In the example embodiment, the plurality of ECUs 104 includes a plurality of ECUs 104-1 . . . 104-N, where N is an integer greater than one.

Each ECU 104 includes a processor and a memory and is configured to monitor/control one or more particular vehicle subsystems or components such as, for example, a transmission, an engine, a brake system, etc. (not shown). Each ECU 104 includes an embedded application client 106 configured to download and execute instructions, as well as a lightweight application framework 108 configured to provide interfaces and advanced capabilities to the client 106.

The embedded application client 106 is a lightweight execution environment that runs on the ECU's processor. It is designed to download and execute software applications and instructions related to vehicle diagnostics, operations, and other vehicular functions. The application client 106 serves as a secure runtime to ensure only authorized code can execute on the ECU 104.

The lightweight application framework 108 is a software layer that provides interfaces and advanced capabilities to the client 106. This allows the client 106 to interact and communicate with other vehicle components and systems over the CAN bus 130. The framework 108 facilitates accessing vehicle data from various sensors and ECUs, as well as performing computing operations on this data. It essentially extends the functionality of the lightweight client 106 by providing APIs, libraries, and services for activities like transmitting/receiving data over the CAN bus, reading vehicle parameters, executing diagnostic routines, and more. Together, the client 106 and framework 108 enable each ECU 104 to run embedded software for monitoring, control, and diagnostics of its associated vehicle systems.

Further, one or more ECUs 104 include diagnostic translations, which in one example, refer to a database or library of DTCs mapped to their corresponding descriptions and fault information for that specific vehicle make, model and year. These translations allow the raw DTC codes output by the vehicle's systems to be decoded into human-understandable format. The translation data is initially loaded from the vehicle manufacturer onto each ECU's non-volatile memory during vehicle assembly. It can also be updated over-the-air by downloading new translation files from the backend server 150 to ensure the latest DTC dataset is available on the vehicle as new models are released. The DTC translation files essentially act as a lookup table or codebook-when an ECU receives a numeric DTC code, it can use these files to cross-reference and translate that code into a descriptive fault message explaining the issue detected by the vehicle's diagnostic systems.

The telematics device 110 is a device designed to ensure the wireless connectivity of the vehicle 102 and enables the exchange of data with external infrastructure such as a network 140. The network 140 can be any suitable communication network including, for example, a satellite network, a cellular network (3G, 4G LTE, 5G, etc.), a computing network (local area network, the internet, etc.), or some combination thereof. The network 140 is connected to a secure backend server 150 that includes one or more secure servers, which for example, are owned and operated by a particular vehicle original equipment manufacturer (OEM) and are only accessible to authorized users.

The vehicle display 120 is a user interface such as, for example, an infotainment system having a display (e.g., a touchscreen), an instrument panel cluster, and/or other screen/display configured to display vehicle information. As described herein in more detail, the vehicle diagnostic translation system 100 is configured to translate one or more diagnostic trouble codes (DTCs) from the plurality of ECUs 104 in real-time, and subsequently provide a notification on the vehicle display 120 regarding specific information related to the DTC. This is configured to inform the driver of any vehicle issues and enable quick and straightforward resolution thereof without specialized externally coupled OBD devices or vehicle technicians.

Figure 2:
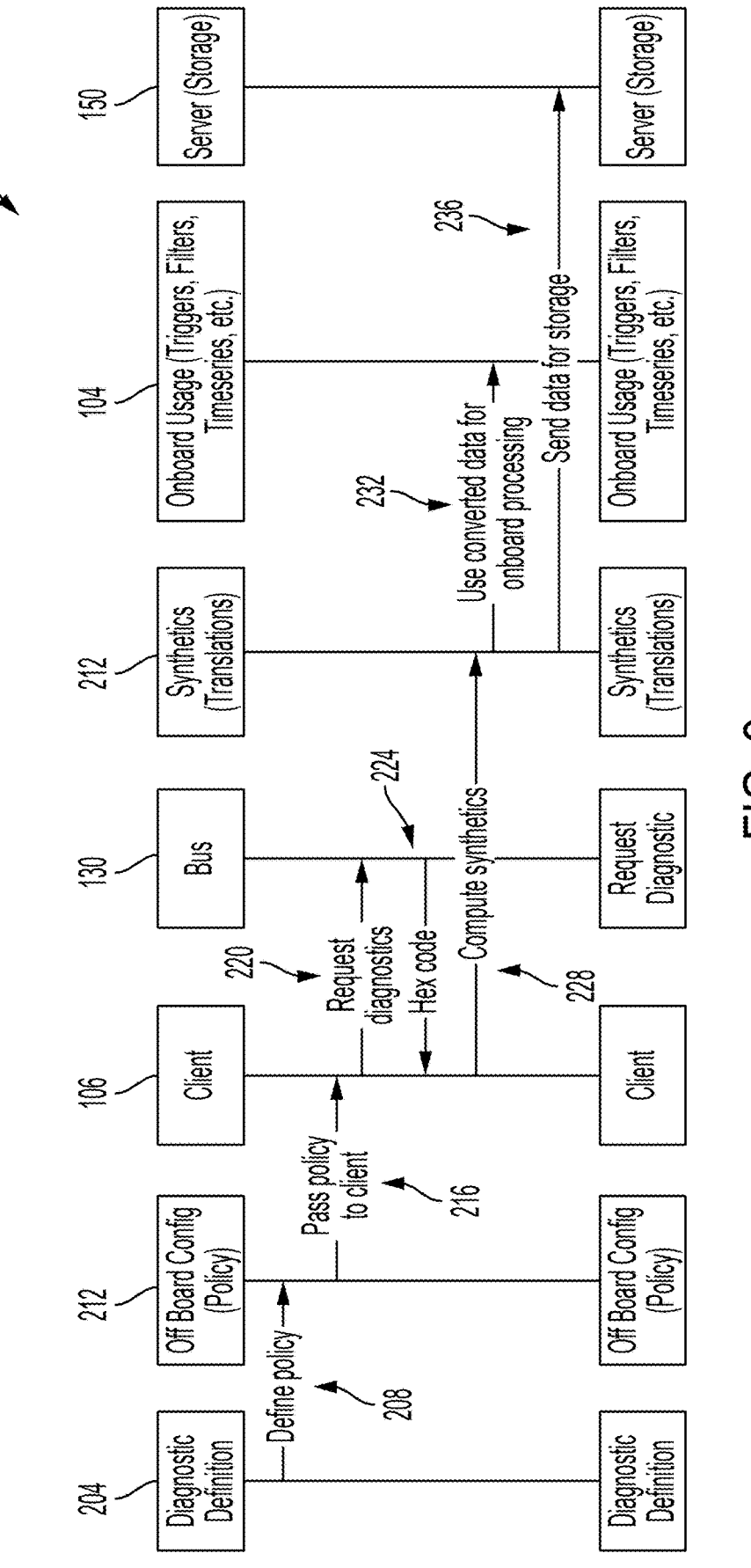
FIG. 2 is a dataflow diagram of an example real-time onboard diagnostic translation procedure of the system of FIG. 1, in accordance with the principles of the present application.

Referring now to FIG. 2, a dataflow diagram of an example onboard real-time diagnostic translation procedure 200 of a vehicle according to the principles of the present application is illustrated. While the vehicle 102 and its components (e.g., the ECUs 104) are specifically referenced for descriptive purposes, it will be appreciated that this procedure 200 could be applicable to any suitable and similarly configured multi-ECU vehicle.

At 204, a diagnostic definition is established by vehicle engineers analyzing the vehicle's systems and components to determine the potential DTCs that may be generated and their corresponding fault descriptions. This creates a master list of all possible DTCs and translations for that specific vehicle make, model and year. At 208, the diagnostic definition is sent to an off-board configuration system 212 operated by the vehicle manufacturer. At the configuration system 212, software policies and instructions are automatically generated based on the diagnostic definition. These policies configure how the DTCs will be monitored, transmitted, translated, and processed by the vehicle's ECUs 104.

One or more policies (e.g., instructions) are written based on the diagnostic definition to provide this configuration to the vehicle ECUs 104.

At 216, the policy is sent to the client 106. At 220, the client 106 requests diagnostics from the CAN bus 130 per the received policy. At 224, the CAN bus 130 provides the requested diagnostics to the client 106. In one example embodiment, the CAN bus 130 provides a hexadecimal (hex) code, which is a numeral system with a base of 16, using 16 distinct symbols (0-9 and A-F) to represent values. Hexadecimal is commonly used in computing to represent binary data in a human-readable format. While a hexadecimal code is given as an example, the CAN bus can transmit diagnostic data in various formats like binary, decimal, etc. The real-time translation system is designed to be universal and translate any type of diagnostic code or data received from the vehicle's systems.

At 228, the client 106 computes the synthetics (e.g., translates) the received hex code, for example, based on a database of previously uploaded diagnostic translations. In one example, the client 106 runs a diagnostic translation algorithm to convert the received code into a human-readable format by looking up the code in the loaded translation files stored in the ECU's memory. The algorithm cross-references the numeric code against the DTC translation database to find the corresponding descriptive fault message.

At 232, the converted data is utilized for onboard processing, such as triggers, filters, timeseries, etc. In one example, once the DTC is translated by the client 106, the converted descriptive data can be used by that ECU 104 and/or other vehicle systems for various on-board processing purposes such as: setting diagnostic trouble flags/status, running troubleshooting routines to identify root cause, implementing fault mitigations or fail-safe modes, analyzing time-series data and fault trends, and/or displaying warning notifications to the driver on vehicle display 120. Additionally or alternatively, at 236, the converted data is sent to backend server 150 for storage and/or further use.

Figure 3:
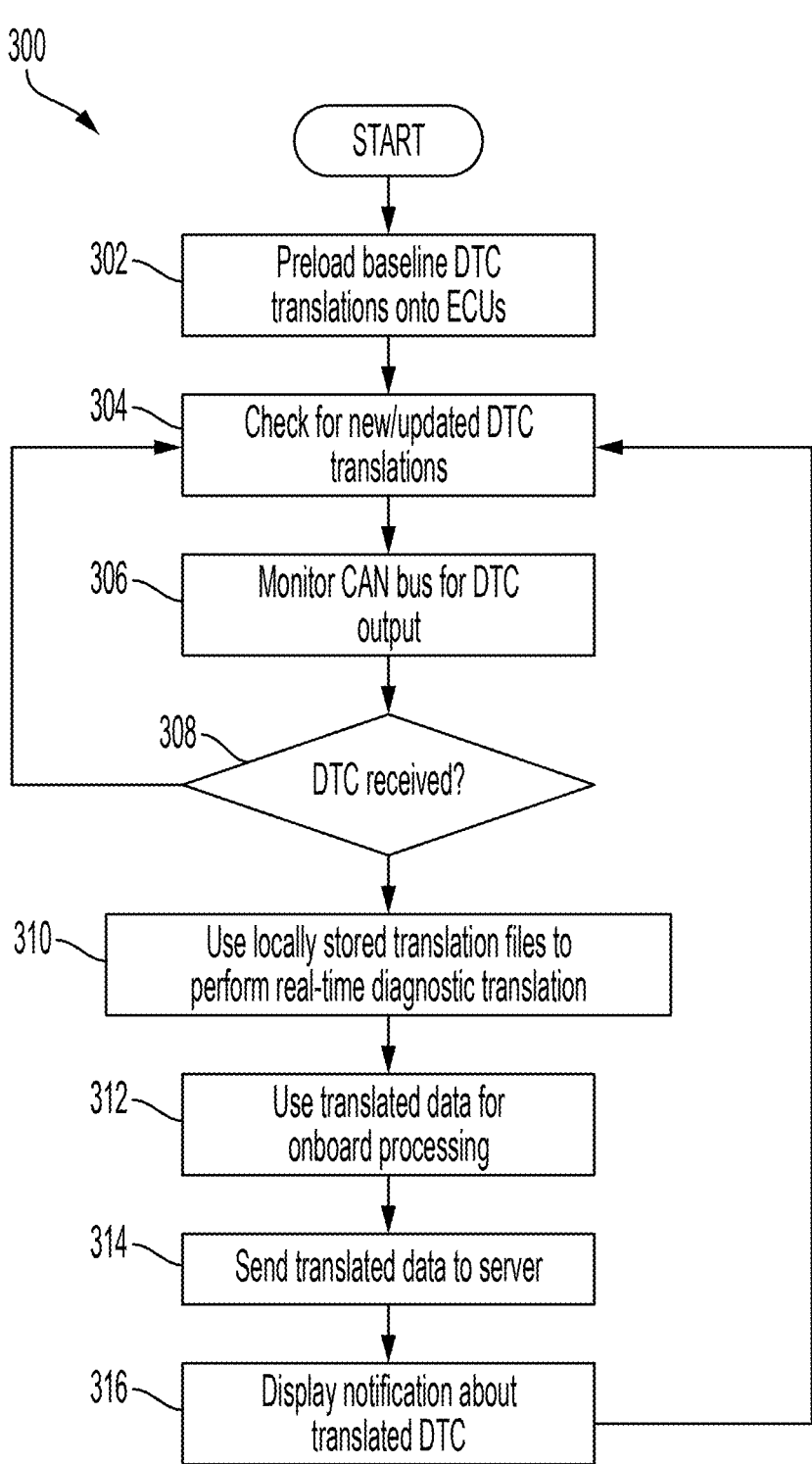
FIG. 3 is a flow diagram illustrating an example method of real-time onboard diagnostic translation, in accordance with the principles of the present application.

With reference now to FIG. 3, a flow diagram of an example method 300 of defining and translating one or more DTCs with translation system 100 is illustrated. Again, while the vehicle 102 and its components (e.g., the ECUs 104) are specifically referenced for descriptive purposes, it will be appreciated that this method 300 could be applicable to any suitable and similarly configured multi-ECU vehicle. The method begins at step 302 and baseline DTC translation files from the manufacturer are preloaded onto ECUs 104 during vehicle assembly. At step 304, ECUs 104 periodically check if any new/updated DTC translation files are available from backend server 150. At step 306, ECUs 104 monitor the vehicle CAN bus 130 for any DTC codes output from electronic vehicle systems/components.

At step 308, system 100 determines if an ECU 104 has received a DTC code. If no, control returns to step 304. If yes, at step 310, the ECU 104 utilizes the locally stored translation files to perform a local, real-time diagnostic translation by decoding the hexadecimal DTC code into a descriptive fault message. At step 312, system 100 utilizes the translated data within that ECU 104 and/or other vehicle systems for on-board diagnostics and processing such as, for example, setting diagnostic trouble flags/status, running troubleshooting routines, implementing redundancy or rail-safe modes, and/or analyzing fault codes and trends over time.

At step 314, system 100 transmits the translated DTC data to the secure backend server 150 for further use such as, for example, for storage, further analysis, updating translation datasets, etc. At step 316, system 100 provides a notification on the vehicle display 120 to alert the driver about the fault condition using the decoded DTC description. Control then ends or returns to step 304.

Figure 4:
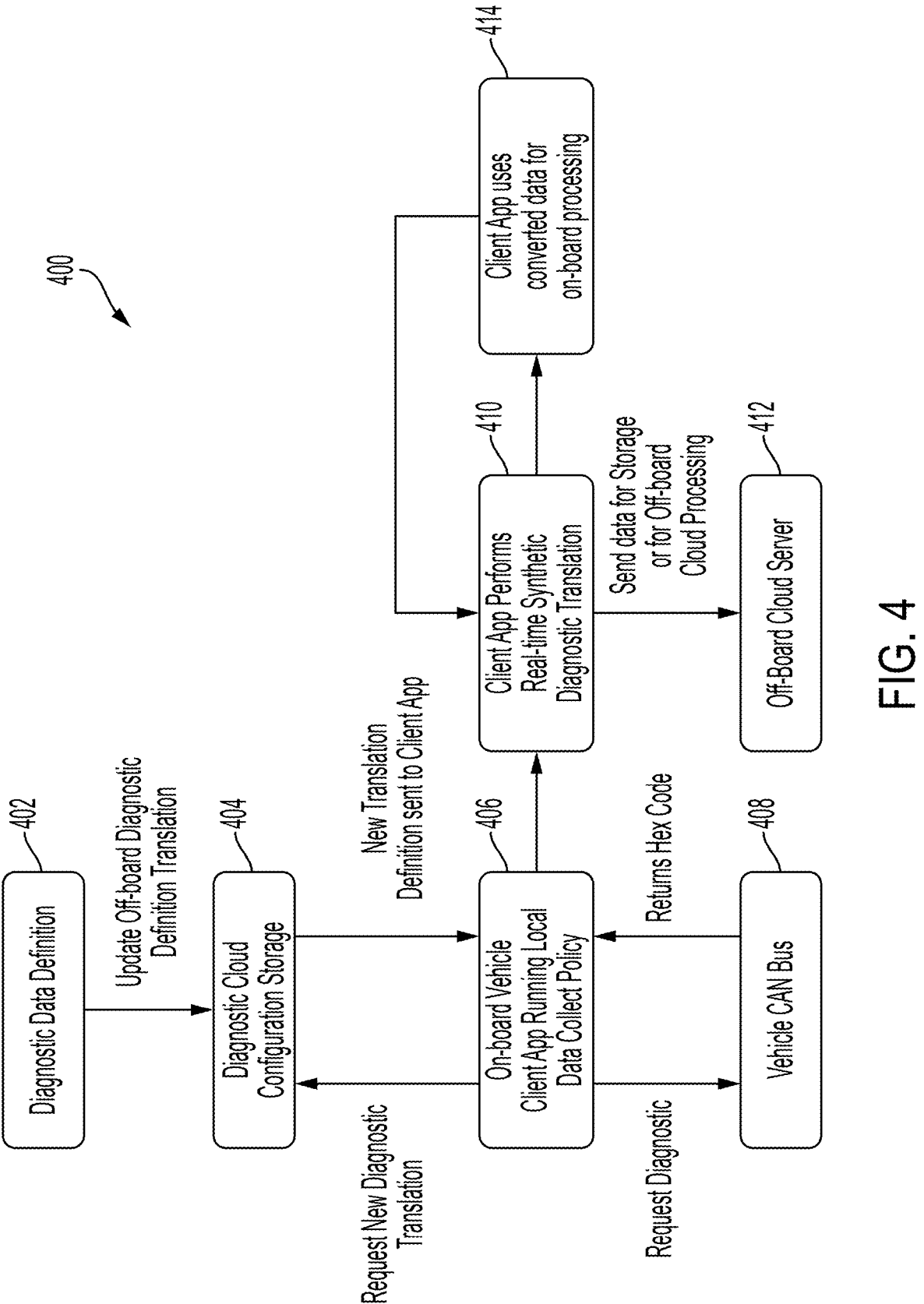
FIG. 4 is dataflow diagram of another example real-time onboard diagnostic translation procedure of the system of FIG. 1, in accordance with the principles of the present application.

FIG. 4 illustrates another example flow chart 400 describing operation of the translation system 100. Diagnostic data definition 402 is created or updated and sent as off-board diagnostic translation to the diagnostic cloud configuration storage 404, for example, at secure backend server 150. The translation definition data is sent to the onboard vehicle client application 406 (106) running one or more local data collection policies.

The onboard vehicle client app 406 may request new diagnostic translations from the diagnostic cloud configuration storage 404, as well as request diagnostics from the vehicle CAN bus 408 (130), which then returns the requested diagnostics as a hex code. The onboard vehicle client app 406 performs real-time synthetic diagnostic translation(s) at 410, and subsequently sends the translated data to the off-board cloud server 412 (150) and/or utilizes the converted data for onboard processing at 414.

Described herein are systems and methods for real-time onboard processing of diagnostic translations. Diagnostic translations are loaded onto one or more vehicle modules or controllers and updated via a telematics service back-end cloud system. The module/controller trouble code database is updated periodically or manually to ensure the latest translations are available. The module/controller performs local, real-time diagnostic translation of raw DTCs based on the ECU trouble code database. The module/controller may also notify the driver or a mechanic of any vehicle issues, based on the diagnostic translations. As such, the system provides a convenient and cost-effective solution for diagnosing and resolving issues with a vehicle ECU in real-time.

It will be appreciated that the term "controller" or "module" as used herein refers to any suitable control device or set of multiple control devices that is/are configured to perform at least a portion of the techniques of the present disclosure. Non-limiting examples include an application-specific integrated circuit (ASIC), one or more processors and a non-transitory memory having instructions stored thereon that, when executed by the one or more processors, cause the controller to perform a set of operations corresponding to at least a portion of the techniques of the present disclosure. The one or more processors could be either a single processor or two or more processors operating in a parallel or distributed architecture.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

It will be understood that the mixing and matching of features, elements, methodologies, systems and/or functions between various examples may be expressly contemplated herein so that one skilled in the art will appreciate from the present teachings that features, elements, systems and/or functions of one example may be incorporated into another example as appropriate, unless described otherwise above. It will also be understood that the description, including disclosed examples and drawings, is merely exemplary in nature intended for purposes of illustration only and is not intended to limit the scope of the present application, its application or uses. Thus, variations that do not depart from the gist of the present application are intended to be within the scope of the present application.

What is claimed is:

1. A diagnostic translation system for a vehicle, comprising:
   a telematics device configured to communicate with a backend server via a network;
   a CAN bus in signal communication with one or more electronic vehicle systems; and
   a controller having one or more processors, a non-transitory computer-readable storage medium, and diagnostic trouble code (DTC) translation files preloaded onto the non-transitory computer-readable storage medium, wherein the controller is programmed to:
      request and receive, via the CAN bus, raw DTCs from the one or more electronic vehicle systems; and
      perform, using the DTC translation files, a local real-time diagnostic translation of the raw DTCs into a natural language format,
      wherein the DTC translation files include a diagnostic definition configured to generate software policies and instructions to determine how the DTCs will be monitored, transmitted, translated, and processed by the controller.

2. The diagnostic translation system of claim 1, further comprising a vehicle display,
   wherein the controller is further programmed to provide a notification on the vehicle display regarding the translated DTCs, to thereby inform a user of any associated vehicle issues and facilitate resolution thereof without specialized externally coupled onboard diagnostics devices or vehicle technicians.

3. The diagnostic translation system of claim 1, wherein the raw DTCs are a hexadecimal code.

4. The diagnostic translation system of claim 1, wherein the translated DTCs correspond to a descriptive fault message,
   and wherein the controller is configured to display the descriptive fault message on a vehicle display.

5. The diagnostic translation system of claim 1, wherein the controller is further programmed to provide the translated DTCs to the one or more electronic vehicle systems via the CAN bus for further onboard processing purposes.

6. The diagnostic translation system of claim 5, wherein the further onboard processing purposes includes at least one of setting diagnostic trouble flags, running troubleshooting routines to identify a root cause, implementing fault mitigations or fail-safe modes, and analyzing time-series data and fault trends.

7. The diagnostic translation system of claim 1, wherein the controller is further programmed to transmit, via the telematics device, the translated DTCs to the backend server for further use.

8. A diagnostic translation system for a vehicle, comprising:
   a telematics device configured to communicate with a backend server via a network;
   a CAN bus in signal communication with one or more electronic vehicle systems; and
   a controller having one or more processors, a non-transitory computer-readable storage medium, and diagnostic trouble code (DTC) translation files preloaded onto the non-transitory computer-readable storage medium, wherein the controller is programmed to:

request and receive, via the CAN bus, raw DTCs from the one or more electronic vehicle systems; and perform, using the DTC translation files, a local real-time diagnostic translation of the raw DTCs into a natural language format, wherein the controller is further programmed to periodically check, via the telematics device, if any new or updated DTC translation files are available from the backend server.

9. The diagnostic translation system of claim 8, further comprising a vehicle display, wherein the controller is further programmed to provide a notification on the vehicle display regarding the translated DTCs, to thereby inform a user of any associated vehicle issues and facilitate resolution thereof without specialized externally coupled onboard diagnostics devices or vehicle technicians.

10. The diagnostic translation system of claim 8, wherein the raw DTCs are a hexadecimal code.

11. The diagnostic translation system of claim 8, wherein the translated DTCs correspond to a descriptive fault message, and wherein the controller is configured to display the descriptive fault message on a vehicle display.

12. The diagnostic translation system of claim 8, wherein the controller is further programmed to provide the translated DTCs to the one or more electronic vehicle systems via the CAN bus for further onboard processing purposes.

13. A computer-implemented method for locally translating raw diagnostic trouble codes (DTCs) for a vehicle having a telematics device configured to communicate with a backend server, a CAN bus in signal communication with one or more electronic vehicle systems, and a controller having one or more processors and a non-transitory computer-readable storage medium, the method comprising:

pre-loading diagnostic trouble code (DTC) translation files onto the non-transitory computer-readable storage medium;

requesting and receiving, by the controller and via the CAN bus, raw DTCs from the one or more electronic vehicle systems; and performing, by the controller and with the DTC translation files, a local real-time diagnostic translation of the of the raw DTCs into a natural language format, wherein the DTC translation files include a diagnostic definition configured to generate software policies and instructions to determine how the DTCs will be monitored, transmitted, translated, and processed by the controller.

14. The method of claim 13, further comprising:

displaying, by the controller, a notification on a display of the vehicle regarding the translated DTCs, to thereby inform a user of any associated vehicle issues and facilitate resolution thereof.

15. The method of claim 13, wherein the raw DTCs are a hexadecimal code.

16. The method of claim 13, wherein the translated DTCs correspond to a descriptive fault message, the method further comprising:

displaying, by the controller, the descriptive fault message on a display of the vehicle.

17. The method of claim 13, further comprising:

providing, by the controller and via the CAN bus, the translated DTCs to the one or more electronic vehicle systems; and performing, via the one or more electronic vehicle systems, further onboard processing utilizing the translated DTCs.

18. The method of claim 17, wherein the further onboard processing includes at least one of setting diagnostic trouble flags, running troubleshooting routines to identify a root cause, implementing fault mitigations or fail-safe modes, and analyzing time-series data and fault trends.

19. The method of claim 13, further comprising:

periodically checking, by the controller and via the telematics device, if any new or updated DTC translation files are available from the backend server.

20. The method of claim 13, further comprising:

transmitting, by the controller and via the telematics device, the translated DTCs to the backend server for further use.

* * * * *